United States Patent [19]

Schneider

[11] 4,443,742

[45] Apr. 17, 1984

[54] PHASE LOCKED LOOP MOTOR CONTROL SYSTEM

[75] Inventor: Siegfried Schneider, Biebertal, Fed. Rep. of Germany

[73] Assignee: Gestetner Manufacturing Limited, London, England

[21] Appl. No.: 326,070

[22] Filed: Nov. 30, 1981

[30] Foreign Application Priority Data

Dec. 2, 1980 [GB] United Kingdom ............... 8038559

[51] Int. Cl.³ .................................................. G05B 1/06
[52] U.S. Cl. ......................................... 318/85; 318/87; 318/60; 318/314
[58] Field of Search ............... 318/331, 87, 60, 63, 318/85, 314, 318, 375

[56] References Cited

U.S. PATENT DOCUMENTS

| 3,258,669 | 6/1966 | Krassoievitch | 318/314 |
| 3,622,703 | 11/1971 | Ricketts, Jr. | 318/85 |
| 4,092,576 | 5/1978 | Michner | 318/318 X |
| 4,149,193 | 4/1979 | Michner | 318/375 X |

FOREIGN PATENT DOCUMENTS 2011199 7/1980 United Kingdom .

*Primary Examiner*—B. Dobeck
*Attorney, Agent, or Firm*—Fleit, Jacobson, Cohn & Price

[57] ABSTRACT

A phase locked loop control system, in particular for use for synchronizing the operation of a carriage drive motor and a main drive motor in a photocopier, uses a digital frequency- and phase-comparator and relies on the output pulses, used to power the slaved motor, being shaped so that each positive-going d.c. drive pulse is followed by a negative-going d.c. braking pulse of smaller amplitude, to provide positive registration of the slaved motor with the pulsed driving signal.

12 Claims, 5 Drawing Figures

PHASE LOCKED LOOP MOTOR CONTROL SYSTEM

DESCRIPTION

The present invention relates to a phase locked loop motor control system. The invention is of particular relevance to synchronising the operation of a motor-driven scanning carriage of a photocopier with other motor-driven components where strict synchronisation is necessary for achieving a sharply defined image, but is not limited to that application.

Hitherto, a photocopier has used a direct mechanical drive, with appropriate gearing, both to the scanning carriage and the photoconductor drum and to other motor-driven components, so as to achieve accurate registration of the scanned image with the drum movement. There should thus be no loss of definition and also no distortion, resulting from the synchronised line-by-line scan of the original and corresponding line-by-line exposure of the photoconductor. Where more than one image magnification and/or reduction ratio is required, it is customary to use a change speed gear-box which allows one of a limited number of predetermined gear ratios to be selected, again in order to maintain strict accuracy and definition of the image. However, this does not allow for the infinitely variable adjustment of magnification of a zoom lens to be exploited to the full.

Pulsed synchronisation systems are known, for example in the field of 37 quartz oscillator-controlled time pieces". U.S. Pat. No. 3,258,669 (KRASSOIEVITCH) discloses the use of a pulse generator driven by the motor and the comparison of the pulsed output therefrom with a pulsed reference signal from the oscillator.

It is an object of the present invention to provide a pulsed phase locked loop motor control system which is more accurate than those used hitherto.

Accordingly, the present invention provides a phase locked loop motor control system comprising a motor whose operation is to be controlled by said loop, pulse encoder means responsive to operation of said motor for generating a signal indicative of operation of said motor, means for generating a comparison signal with which operation of said motor is to be phase locked, means for generating a pulsed d.c. supply to said motor in response to a comparison of said comparison signal with the output of said pulse encoder means, and pulse-shaping means to ensure said power supply comprises a succession of d.c. pulses each of which pulses is followed by a pulse of smaller amplitude but of reverse polarity.

The principal application of such a system would be in the field of photocopiers, as indicated above. The scanning carriage and the remainder of the motor-driven components (in particular the photoconductor), can be driven by separate motors kept in accurate synchronisation and subject to a variable proportionality which can be derived with such accuracy that there will be no resulting image distortion or loss of definition.

For a variable magnification M over the range $(1/\sqrt{2}) \leq M \leq \sqrt{2}$, an A4 original can be reduced to an A5 copy (with $M = (1/\sqrt{2})$), or can be enlarged to an A3 copy sheet (with $M = \sqrt{2}$). For a non-distorted image the carriage speed $V_1$ and the photoconductor surface speed $V_2$ must be related to the magnification M as follows:

$$V_1 = V_2 \cdot \frac{1}{M}$$

In view of the fixed gearing between the carriage drive motor and the scanning carriage and the fixed gearing between the main drive motor and the photoconductor, the ratio $V_1:V_2$ varies in direct proportion to the ratio $n_1:n_2$, and consequently the synchronisation of the speeds of rotation of the carriage drive motor on the one hand and of the main drive motor on the other hand will suffice for maintaining accurate fidelity of the image.

In order that the present invention may more readily by understood the following description is given, merely by way of example, with reference to the accompanying drawings in which:

FIG. 1 shows a block diagram of the circuitry controlling the carriage drive motor 1 of a photocopier for synchronous operation with the main drive motor 2.

It is preferable, though not essential, for the carriage drive motor 1 to be a flat motor incorporating its own pulse encoder disc because this is a particularly compact arrangement. One such flat motor is available from Matsushita Electrical Company as flat motor SSW996X.

Figure 1:
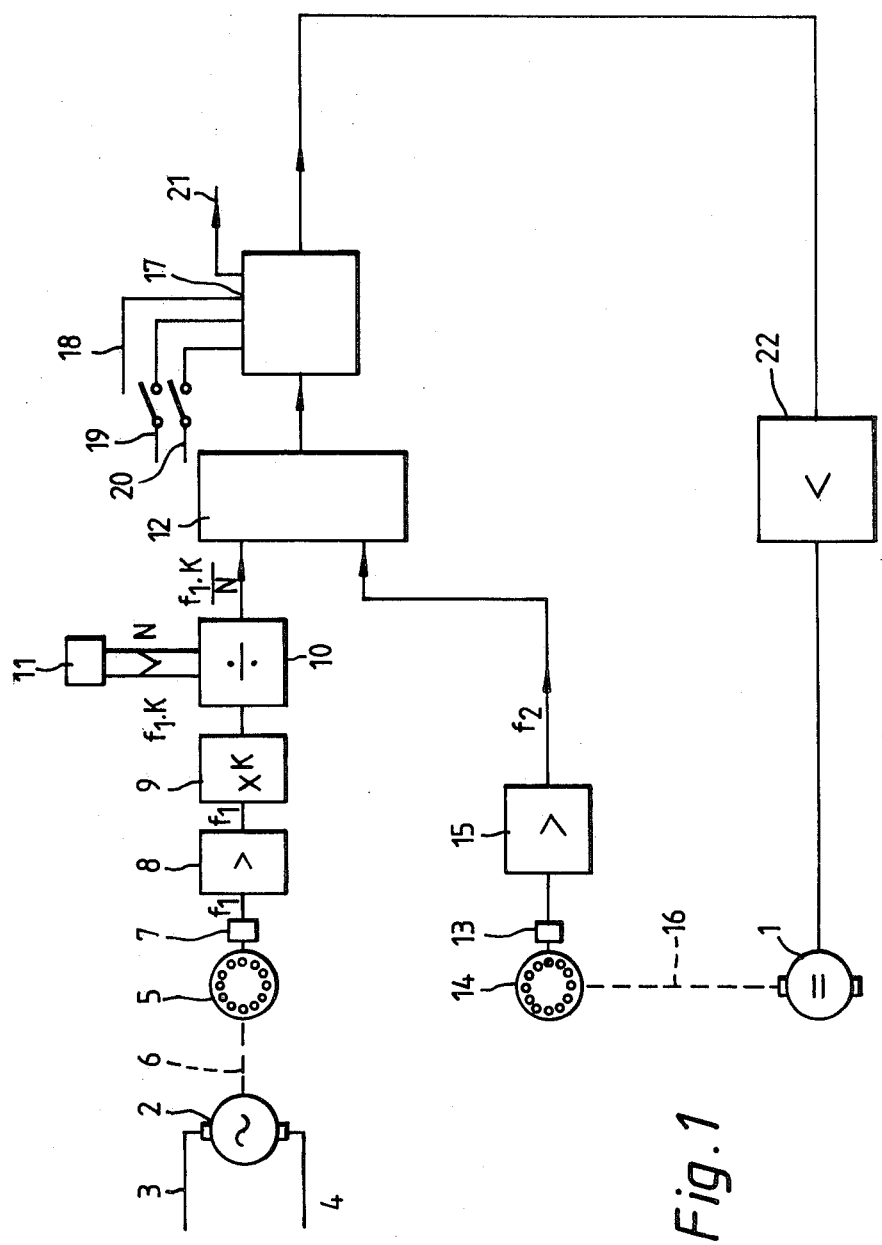
FIG. 1 is a block diagram of a circuit for an embodiment of a phase locked loop control system in accordance with the present invention.

As can be seen from FIG. 1, the main drive motor 2 is energised by mains supply conductors 3 and 4 usually at 50 Herts mains frequency. However, as will be described later, provision for conversion for use with a mains supply at 60 Herts is envisaged. The mechanical connection between the main drive motor 2 and its pulse encoder disc 5 is depicted by a broken line connection 6.

The pulse encoder disc 5 has a set of I holes arranged in a circular configuration around its periphery and is mounted in association with a light source, not shown, and a photosensor 7 such that an electrical pulse is generated at the photosensor 7 corresponding to the passage of one of the holes across the light path between the light source and the photosensor. The output signal from the pulse encoder is of pulsed form in that when a hole is present on the light path the photosensor 7 will be receiving light and will be at a 'logic high' electrical state, whereas when there is no hole in the light path the disc will block the arrival of light at the photosensor 7 and the electrical output will be at a 'logic zero' state.

The output signal from the pulse encoder photosensor 7 is at a frequency $f_0$ and is applied as input to an amplifier and Schmitt-trigger unit 8 which both amplifies the signal and transforms it to a square wave pulse form having a frequency $f_1$.

The output from the amplifier 8 is then applied as input to a frequency multiplier unit 9 which multiplies the input frequency $f_1$ by a factor K to produce an output signal having a frequency $f_{REF}=f_1.K$.

The frequency multiplier unit 9 includes means for conforming the system to either a 50 Herts or 60 Herts mains frequency, and in this case is shown operating at 50 Herts.

The output from the frequency multiplier unit 9 is then applied as input to a programmable frequency divider 10 which carries out the operation of dividing the frequency $f_{REF}$ of the input signal by N. The particular divisor N is selected by means of a controller 11 which also actuates the drive motor of the zoom lens 32 (FIG. 4) of the photocopier in which the carriage drive motor 1 and the main drive motor 2, in this preferred embodiment of the invention, are used.

As will be readily appreciated, for reducing the size of the image it will be necessary to speed-up the travel of the scanning carriage with respect to the speed of travel of the photoconductor. For this reason, when the operator selects a different magnification/reduction ratio the programme of the frequency divider is automatically selected to a different predetermined programme.

The output signal from the programmable divider 10 represents a frequency $$\frac{f_{REF}}{N} = \frac{f_1 \cdot K}{N}$$

and is applied as one input to a digital phase locked loop device in the form of a frequency and phase comparator 12.

The other input to the phase locked loop device 12 is representative of the output signal from the photosensor 13 of the carriage drive motor pulse encoder disc 14. As can be seen from FIG. 1, the output frequency signal $f_2$ from the pulse encoder photosensor 13 is applied as input to an amplifier and Schmitt Trigger unit 15 whose output, again having a frequency $f_2$, is then applied as the second input to the phase locked loop frequency and phase comparator 12.

The mechanical connection between the carriage drive motor 1 and the carriage drive motor pulse encoder disc 14 is illustrated by the broken line 16 in FIG. 1.

The output frequency signal $f_3$ from the frequency and phase comparator 12 is applied as input to a direction control unit 17 having three control inputs, a first or "enable" input 18, a second or "copy" input 19 and a third or "reverse" input 20. The direction control unit 17 also has an output 21 which can be used for actuating an indicator to show when the scan movement is completed and the return movement begins, in order, for example, to indicate that exposure is complete and the copier is ready to accept the next original.

The pulse width modulated output signal from the direction control unit 17 is applied as input to a power stage pulse shaping unit 22 whose pulsed output is applied to the d.c. carriage drive motor 1 to actuate the motor.

The system illustrated in FIG. 1 therefore depicts a phase locked loop control system for the carriage drive motor 1 so as to maintain the rotation of the carriage drive motor 1 in a pre-programmed relationship to the non-stabilised rotation of the main drive motor 2.

Figure 2:
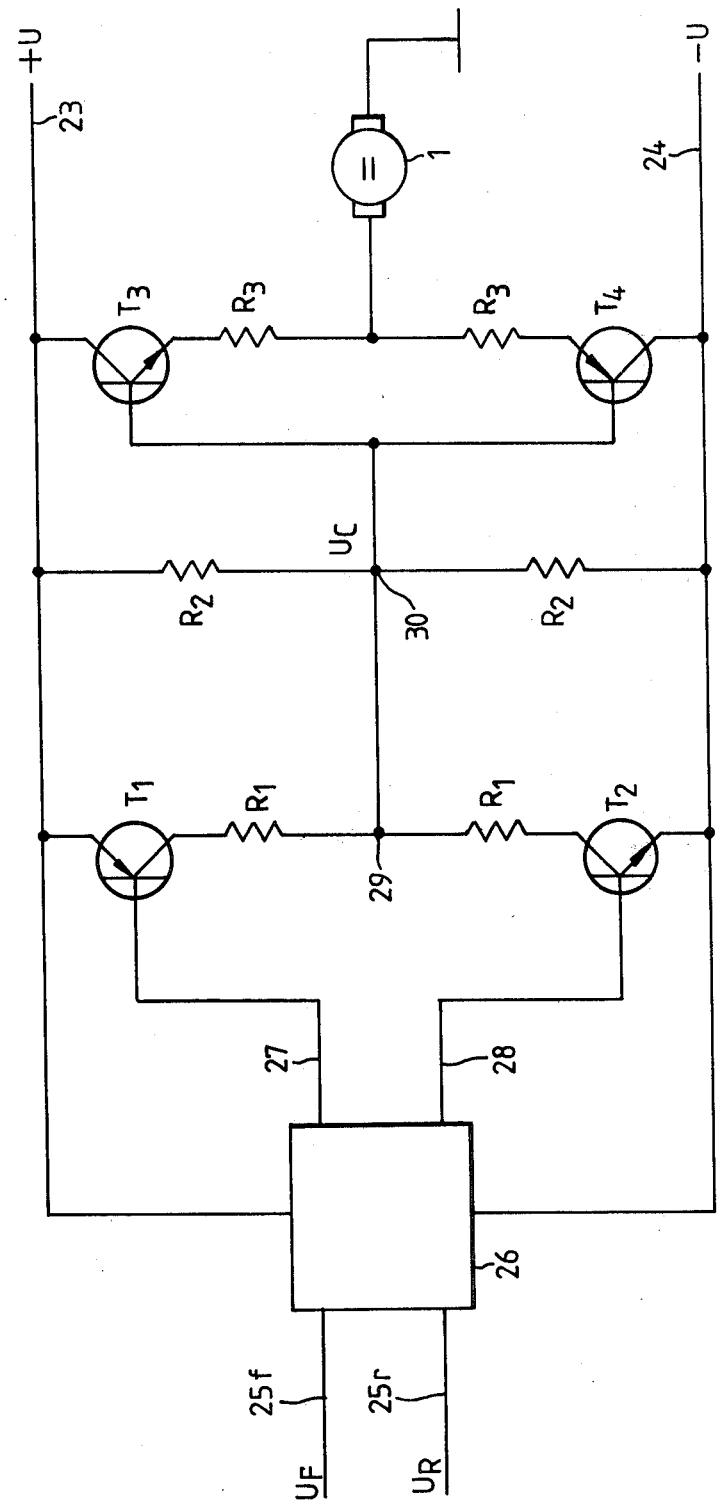
FIG. 2 is a circuit diagram of the power stage of the system shown in FIG. 1.

FIG. 2 shows a circuit diagram of the power stage 22 which provides pulse-shaping of the initially square wave pulses delivered by the direction control unit 17.

The circuitry shown in FIG. 2 includes the carriage drive motor 1 which is, of course, the load.

Main supply terminals 23 and 24 carry d.c. at potential +u and −u, respectively. The input signal to the power stage 22 is applied via lines 25$f$ and 25$r$, respectively which are connected to a level converter 26 which also receives the full d.c. signal from terminals 23 and 24 and delivers outputs 27, to transistor $T_1$, and 28, to transistor $T_2$. The collector of transistor $T_2$ is connected to point 29 via a first resistor $R_1$, and the emitter of transistor $T_1$ is connected to the same point via an equal resistor $R_1$. The point 29 is connected to the bases of transistors $T_3$ and $T_4$, by way of the neutral mid-point 30 of a double resistor network including two resistors $R_2$. From point 30 the voltage $u_c$ is applied to the bases of transistors $T_3$ and $T_4$. Two identical resistors $R_3$ connect, on the one hand the emitter of the transistor $T_3$ and, on the other hand, the collector of the transistor $T_4$ to the carriage drive motor 1.

Figure 3:
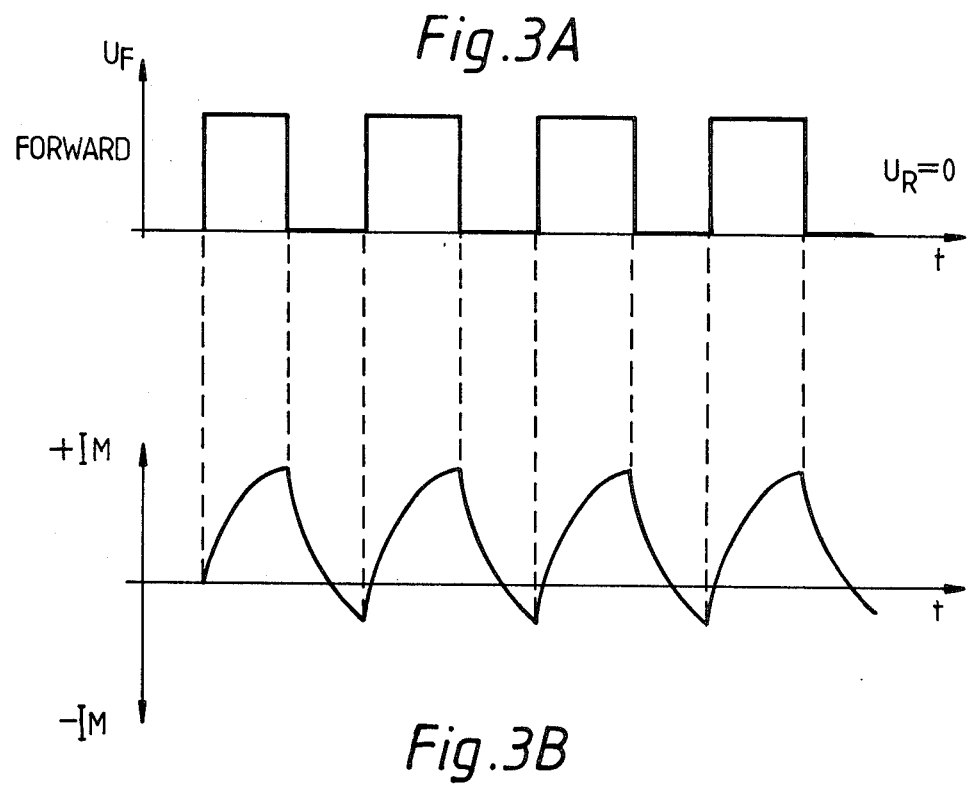
FIG. 3A is a graph plotting the square wave pulse delivered from the direction control unit of the system shown in FIG. 1.
FIG. 3B is a graph plotting the modified pulses applied as input to the slave motor of the system of FIG. 1.

FIG. 3A shows the square wave form of the pulses of voltage $u_f$ on line 25$f$. This is while the voltage $u_r$ is logic zero. In this circuit configuration, transistor $T_1$ becomes conducting and the control voltage $u_c$ on the base of each of the two transistors $T_3$ and $T_4$ is +u. This causes transistor $T_3$ to become conducting as well, so that the motor 1 runs in a forward direction. When the input signal at $u_f$ goes from logic high to logic zero at the end of a pulse, transistors $T_1$ and $T_3$ will be suppressed and the positive supply voltage +u is switched off from the motor. However, the inductance of the motor will generate a self-induction voltage having a value $U = -L \cdot (di/dt)$, causing the emitter of transistor $T_4$ to become negative with respect to earth while the base of transistor $T_4$ is near earth potential because of the effect of the two resistors $R_2$. Therefore transistor $T_4$ becomes conducting and supplies the motor 1 with a small negative-going d.c. braking pulse which reaches its negative peak at the rising front of the next square wave pulse shown in FIG. 3A. The motor current $I_m$ is plotted against time on FIG. 3B. The time scales of the abscissae on FIGS. 3A and 3B are the same, so a direct comparison of the timing of the pulses of voltage $u_f$ and the current $I_m$ can be made.

At the end of a scan the direction control unit 17 changes its output state so that voltage signal $u_r$ on line 25$r$ reaches the logic high state and the voltage $u_f$ on line 25$f$ becomes logic zero. This will result in a steady d.c. signal $+I_m$ at the motor, resulting in the motor running in the reverse or "re-scan" direction until the next forward scan run is required.

As indicated above, the programmable frequency divider 10 has a varying divider ratio which depends upon the magnification/reduction ratio represented by the position of the movable lens element of the photocopier. However, this same magnification/reduction ratio is effective to control the travel of the carriage drive motor 1 in order to ensure that, once the scanning carriage has moved far enough to scan an area of the entire original which corresponds to the image area on the copy sheet, the direction control unit 17 is immediately energised in the reverse direction in order to commence the return run and to prepare the copier for the next scan movement. For this reason the direction control unit may be controlled in response to the copy sheet length in use, for example so that the control inputs to the direction control unit 17 are alternately operated when the cassette selection (i.e. the copy sheet length selection) at the copy sheet cassettes is changed. Clearly, for a given magnification ratio then the travel of the carriage drive motor will be longer where the cassette selected is one having a longer copy sheet than is the case where the cassette selected has a shorter copy sheet length. Thus the direction control unit is given a sheet length control signal via the inputs connected to the "copy" and "reverse" inputs 19 and 20. The direction control unit receives an "enable" signal on input 18 from the microprocessor when the latter is active.

A preferred form of the carriage drive motor 1 is one in which the armature is of printed circuit form and consequently the inertia of the moving components is kept to an absolute minimum. This facilitates the application of an "emergency stop" braking action on the carriage drive if the carriage passes an "extreme limit" switch, and also has the advantage of reducing the time constant of the control loop and thereby avoiding hunting or overshooting which will of course give rise to inaccuracies in the image printed on the copy sheet. Such an emergency stop is effected by removal of the signal on enable input 18 and the application of a brake on the carriage drive.

The above-mentioned application of a continuous d.c. signal $+u_c$ on the d.c. carriage drive motor ensures that the return motion of the scanning carriage occurs at the maximum possible speed of the motor, whereas during the forward or "scan" movement the pulsed power supply to the carriage drive motor will result in a much slower movement which is exactly in registration with the movement of the photoconductor (subject, of course, to the variable proportionality built in by the divisor N at frequency divider 10) by virtue of the very effective and positive control offered by the phase locked loop control system in accordance with the present invention.

The positive going pulses shown in FIG. 3B measured across a resistor in series with the motor, have an amplitude of 0.45 volts and the negative-going d.c. braking pulse portions have an amplitude of $-0.12$ volts. As an example, the carriage drive motor 1 may be operating at a speed of 1,000 r.p.m. in the scan direction. In the reverse direction of movement, the steady voltage applied may be 250 millivolts, but an initial voltage much higher than this is experienced by the drive motor 1 at the start of its return movement. This pulsed forward powering and continuous reverse powering ensures that much faster rotation of the carriage drive motor 1 can be achieved in the reverse direction and, for the example given, a speed of rotation of 2,100 r.p.m. may be experienced in the reverse direction.

The operation of the speed control circuit shown in FIG. 1 is as follows.

The frequency generated by the pulse encoders comprising discs 5 and 14 and the photosensors 7 and 13, respectively, are in a linear relationship to the speed of the respective motor 2, 1. The amplifiers 8 and 15 transform the encoder signal to square wave signals $f_1$ and $f_2$ of increased amplitude, and then one of these two signals, $f_1$, is multiplied by a factor K in the frequency multiplier 9 (shown in block diagram form in FIG. 1 but in fact comprising a phase locked loop device, a voltage control oscillator, and a divider).

The output frequency of this multiplier is termed the reference frequency ($f_{REF}$) and will clock the "divide by N" counter 10. The 8-bit hexadecimal number, representing the value N, defines the magnification selected. In other words the output frequency of this multiplier stage depends on the speed of the main drive motor 1 and on the magnification M, and is connected to the first input of the frequency- and phase-comparator 12 serving as the digital phase locked loop device. This device 12 is in lock when the phase difference between the two input signals is zero, and when both input frequencies ($f_1 \cdot K$/and $f_2$/N) are equal.

In this state:

$$\frac{f_{REF}}{N} = f_2$$

but $$f_{REF} = f_1 \cdot K$$

$$\frac{f_1 \cdot K}{N} = f_2 \quad (1)$$

However,
$$f_1 = n_1 I$$

and
$$f_2 = n_2 I$$

So by substituting in (1) we have:

$$\frac{n_1 \cdot I \cdot K}{N} = n_2 \cdot I$$

or $$\frac{n_1 \cdot K}{N} = n_2$$

and thus $$\frac{n_1}{n_2} = \frac{N}{K}$$

To get a variable magnification, the relationship ($n_1/n_2$) for 1:1 image ratio must be multiplied times M. This gives:

$$\frac{n_1 (1:1)}{n_2 (1:1)} \cdot M = \frac{N}{K} \quad (2)$$

or $$M = \frac{N \cdot n_2 (1:1)}{K \cdot n_1 (1:1)}$$

Figure 4:
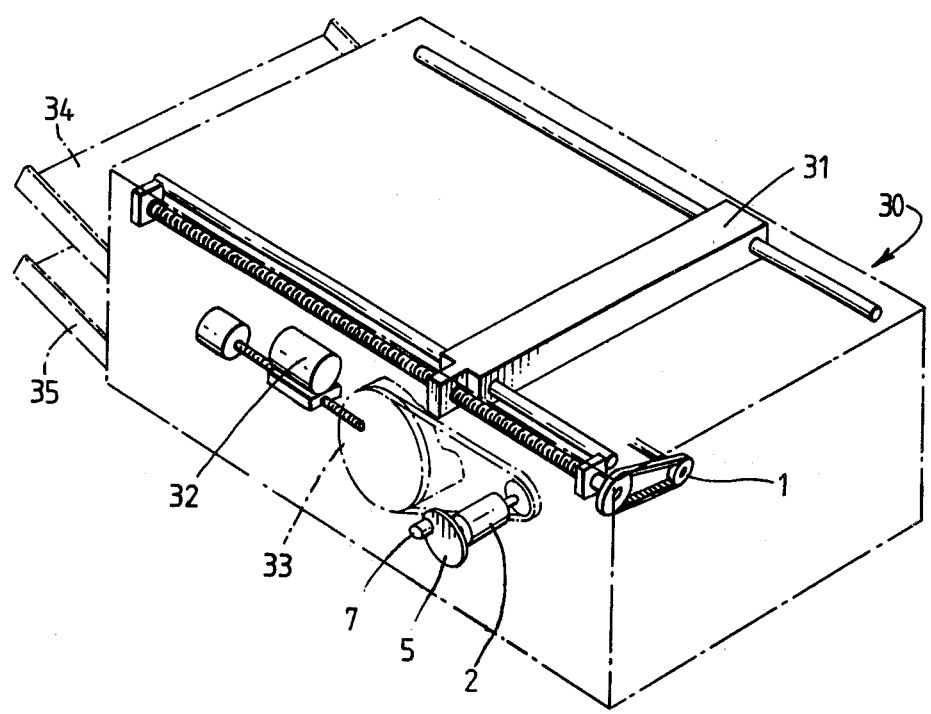
FIG. 4 is a schematic perspective showing a photocopier in which the system in accordance with the present invention is particularly useful.

FIG. 4 shows, in schematic form, a perspective of the photocopier 30 in which the above described phase locked loop control circuit and carriage drive motor 1 and main drive motor 2 are incorporated. The photocopier includes a scanning carriage 31 and a variable magnification zoom lens 32. Adjustment to a different image size ratio will both reposition the movable optical elements of the zoom lens 32 and alter the ratio of proportionality of the movement of the scanning carriage 31 to the rotation of the photoconductor (in this case a coated drum 33) powered by the main drive motor 2.

Likewise, the size of copy paper sheets in the two cassettes 34 and 35 will be different, so the selection of one or other of these two cassettes will also have an effect on the setting of the zoom lens 32 and on the ratio of proportionality of the scanning carriage movement:-photoconductor movement.

In the above described embodiment the pulse encoder means comprise discs having holes which intersect the light path from a light source to a photosensor. However, it is possible to incorporate any other form of pulse encoder means, for example a disc having magnetic irregularities in its periphery and associated with magnetic detector means delivering an output signal response to the passing periphery.

Although the phase locked loop control circuit in accordance with the present invention has been exemplified in terms of a circuit connecting the various drive motors of a photocopier, it should be borne in mind that this is one particular application of the circuit in accordance with the invention and consequently the invention should not be considered as limited to that particular application.

The frequency multiplier 9 is very advantageous in that the input frequency ($f_1 \cdot K/N$) to the phase locked loop device 12 will vary in response to changes in the magnification as reflected in the divisor N. However, since the divisor N must be an integer, it is advantageous for the multiplication factor K to be high in order to ensure that the frequency difference between a first frequency valve corresponding to a divisor N' and the next frequency value corresponding to the divisor N'+1 is as great as possible. This provides a larger number of increments in the magnification for the range of magnification values between the same two upper and lower limits of the range.

I claim:

1. A phase locked loop motor control system for controlling a motor including inductive windings having a self-inductance, comprising:

pulse encoder means responsive to operation of said motor for generating an output signal indicative of operation of said motor;

generating means for generating a comparison signal with which operation of said motor is to be phase locked;

comparing means for comparing said comparison signal with the output signal of said pulse encoder means, and for generating and providing to said motor a pulsed d.c. supply in accordance with the comparison of said comparison signal with the output signal of said pulse encoder means; and pulse-shaping means responsive to the self-inductance of said inductive windings of the motor for shaping said pulsed d.c. supply so that it comprises a succession of d.c. drive pulses having a first polarity and a first amplitude, and a succession of d.c. braking pulses having a second polarity and a second amplitude, said second polarity being opposite to said first polarity, and said second amplitude having a smaller modulus than said first amplitude and also being directly proportional to a rate of decay of current at the end of each said drive pulse, wherein the drive pulses and the braking pulses occur alternatively in sequence.

2. A phase locked loop motor control system according to claim 1, and including a further motor whose operation is to be synchronised with that of the motor controlled by said control system, and means connecting said second motor to said control system for achieving such synchronisation.

3. A phase locked loop motor control system according to claims 1 or 2, wherein said pulse-shaping means includes a direction control unit for applying a constant negative voltage to the motor controlled by said control system for rotation in the reverse direction.

4. A phase locked loop motor control system for synchronizing a first motor with the operation of a further motor, said first motor including conductive windings having a self-inductance, said system comprising:

pulse encoder means responsive to the operation of said motor for generating an output signal indicative of the operation of said motor;

generating means for generating a comparison signal with which the operation of said motor is to be phased locked, said generating means including a further pulse encoder means operatively connected to said motor and being responsive to the operation of said further motor for generating an output signal indicative of the operation of said further motor, whereby the comparison signal generated by said generating means is phased locked with the output signal generated by said further pulse encoder means;

comparing means for comparing said comparison signal with the output signal of said pulse encoder means, and for generating and providing to said motor a pulsed d.c. supply in accordance with the comparison of said comparison signal and the output signal of said pulse encoder means; and pulse-shaping means responsive to the self-inductance of said conductive windings of the motor for shaping the pulsed d.c. supply so that it includes a succession of d.c. drive pulses having a first polarity and a first amplitude, and a succession of d.c. braking pulses having a second polarity and a second amplitude, said second polarity being opposite to said first polarity, and said second amplitude having a smaller modulus than said first amplitude and also being directly proportional to the rate of decay of current at the end of each drive pulse, whereby the drive pulses and the braking pulses occur alternately in sequence.

5. A phase locked loop motor control system according to claim 4, wherein the respective output signals generated by said pulse encoder means and said further pulse encoder means have respective signal frequencies, and said generating means comprises frequency comparison means responsive to the respective output signals of said pulse encoder means and said further pulse encoder means for generating an output signal effective to maintain synchronisation of the signal frequencies from the pulse encoder means and the further pulse encoder means.

6. A phase locked loop motor control system according to claim 5, wherein said generating means includes a programmable frequency divider which frequency divides an input signal to generate a frequency divider output, and which is in circuit between said further pulse encoder means and said frequency comparison means for effecting variation of the proportionality of the output signal of said programmable frequency divider to its input signal.

7. A phase locked loop motor control system according to claim 5, wherein said frequency comparison means comprises a digital phase locked loop device.

8. A phase locked loop motor control system according to claims 4, 5, 6 or 7, and including stepping up means associated with the further pulse encoder means for stepping up the pulse frequency of the output signal generated by said further pulse encoder means.

9. A phase locked loop motor control system according to claim 8, wherein said stepping up means comprises a step-up geared mechanical connection between said further motor and said further pulse encoder means for increasing the pulse rate of the output signal of said further pulse encoder means with respect to the frequency which it would have in the absence of such step-up geared mechanical connection.

10. A phase locked loop motor control system according to claim 6, including stepping up means associated with the further pulse encoder means for stepping up the pulse frequency of the output signal generated by said further pulse encoder means, and wherein said stepping up means comprises a frequency multiplier connected in circuit between said further pulse encoder means and said programmable frequency divider.

11. A phase locked loop motor control system according to claim 6, and including means for introducing an input signal to said programmable frequency divider for varying the frequency division operation of said frequency divider in an infinitely variable manner over a given range.

12. A phase locked loop motor control system according to claims 4, 5, 6, 7, or 11 wherein said pulse-shaping means includes a direction control unit for applying a constant negative voltage to the motor controlled by said control system for rotation in the reverse direction.

* * * * *